(12) United States Patent
Albrecht et al.

(10) Patent No.: US 10,366,094 B2
(45) Date of Patent: Jul. 30, 2019

(54) DATA ACCESS USING AGGREGATION

(71) Applicant: SAP SE, Walldorf (DE)

(72) Inventors: Zoltan Albrecht, Karlsruhe (DE);
Ulrich Hanno Peter Christoph Keil, Ramsen (DE)

(73) Assignee: SAP SE, Walldorf (DE)

( * ) Notice: Subject to any disclaimer, the term of this patent is extended or adjusted under 35 U.S.C. 154(b) by 389 days.

(21) Appl. No.: 15/296,897

(22) Filed: Oct. 18, 2016

(65) Prior Publication Data

US 2018/0107719 A1 Apr. 19, 2018

(51) Int. Cl.
*G06F 16/2458* (2019.01)
*G06F 16/248* (2019.01)
*G06F 16/22* (2019.01)

(52) U.S. Cl.
CPC ...... *G06F 16/2477* (2019.01); *G06F 16/2228* (2019.01); *G06F 16/248* (2019.01)

(58) Field of Classification Search
CPC ............ G06F 16/2477; G06F 16/2228; G06F 16/248; G06F 17/30551
USPC ........................................................ 707/725
See application file for complete search history.

(56) References Cited

U.S. PATENT DOCUMENTS

| | | | | |
|---|---|---|---|---|
| 8,365,213 B1* | 1/2013 | Orlowski | ........... | G06Q 30/0251 725/13 |
| 9,554,203 B1* | 1/2017 | Pavlidi | ..................... | H04R 1/08 |
| 2005/0066118 A1* | 3/2005 | Perry | .................. | G06F 11/1469 711/112 |
| 2010/0333116 A1* | 12/2010 | Prahlad | ............. | G06F 17/30082 719/328 |
| 2012/0266251 A1* | 10/2012 | Birtwhistle | ......... | G06F 19/3481 726/26 |
| 2012/0269053 A1* | 10/2012 | Yu | ....................... | H04L 12/4641 370/216 |

\* cited by examiner

*Primary Examiner* — Dung K Chau
(74) *Attorney, Agent, or Firm* — Schwegman Lundberg & Woessner, P.A.

(57) ABSTRACT

Methods, systems, and computer program products for accessing data in a data structure are described. Data from a write data structure is read and aggregated into a plurality of data buckets, each data bucket corresponding to a time window. Each data bucket is stored in a read data structure.

21 Claims, 9 Drawing Sheets

| | 408 | 412 | 416 | 420 |
|---|---|---|---|---|
| | TRANS. ID | PRODUCT TYPE | PRODUCT VOLUME (k) | SALES VOLUME (M) |
| | 25001 | 10025 | 25 | 254 |
| | 25002 | 11130 | 89 | 290 |
| | 25003 | 32735 | 165 | 59 |
| | 25004 | 78340 | 169 | 678 |
| | 25005 | 77235 | 173 | 6,883 |
| | 25006 | 49330 | 170 | 671 |
| | 25007 | 93825 | 98 | 68 |
| | 25008 | 10210 | 67 | 3,900 |
| | 25009 | 10110 | 35 | 18 |

| 458 | 462 | 466 | 470 |
|---|---|---|---|
| TRANS. COUNT | SALES VOLUME (k) | X SALES VOLUME (k) | Y SALES VOLUME (k) |
| 470 | 25 | 25 | 25 |
| 6,567 | 30 | 89 | 29 |
| 27 | 35 | 165 | 59 |
| 7,883 | 40 | 169 | 67 |
| 42,371 | 35 | 173 | 68 |
| 667 | 30 | 170 | 67 |
| 78,223 | 25 | 98 | 68 |
| 371 | 10 | 67 | 39 |
| 1,280 | 10 | 35 | 18 |
| 4,367 | 25 | 25 | 25 |
| 234 | 30 | 30 | 30 |

WRITE DATA STRUCTURE: A3001

DATA CONTENT: TRANSACTION IDENTIFIER
FORMULA: COUNT

DATA CONTENT: SALES VOLUME
FORMULA: SUMMATION

DATA CONTENT: X SALES VOLUME
FORMULA: SUMMATION

DATA CONTENT: Y SALES VOLUME
FORMULA: SUMMATION

READ DATA STRUCTURE: B4556

FIG. 4C

DATA ACCESS USING AGGREGATION

FIELD

The present disclosure relates generally to accessing data in a data structure. In an example embodiment, the disclosure relates to efficiently accessing data structures in a database using a data aggregation technique.

BACKGROUND

Data often needs to be written to and retrieved from a variety of data structures, such as text files, tables in a database, and the like. Access to data structures for writing data and reading data is often efficient for a single user. As the number of users, write requests, read requests, and the like increases, the response time of the system may become unsatisfactory. A variety of techniques have been designed to improve the performance of such accesses; however, the techniques often provide better performance for write requests at the expense of read requests and vice versa. In many instances, the conventional read and write techniques do not provide satisfactory performance.

BRIEF DESCRIPTION OF DRAWINGS

The present disclosure is illustrated by way of example and not limitation in the figures of the accompanying drawings, in which like references indicate similar elements and in which:

FIG. 4A is a block diagram of an example table for a write data structure, according to an example embodiment;

FIG. 4B is a block diagram of an example table of a read data structure, according to an example embodiment;

FIG. 4C is an example profile for defining a data aggregation, according to an example embodiment;

DETAILED DESCRIPTION

Figure 1:
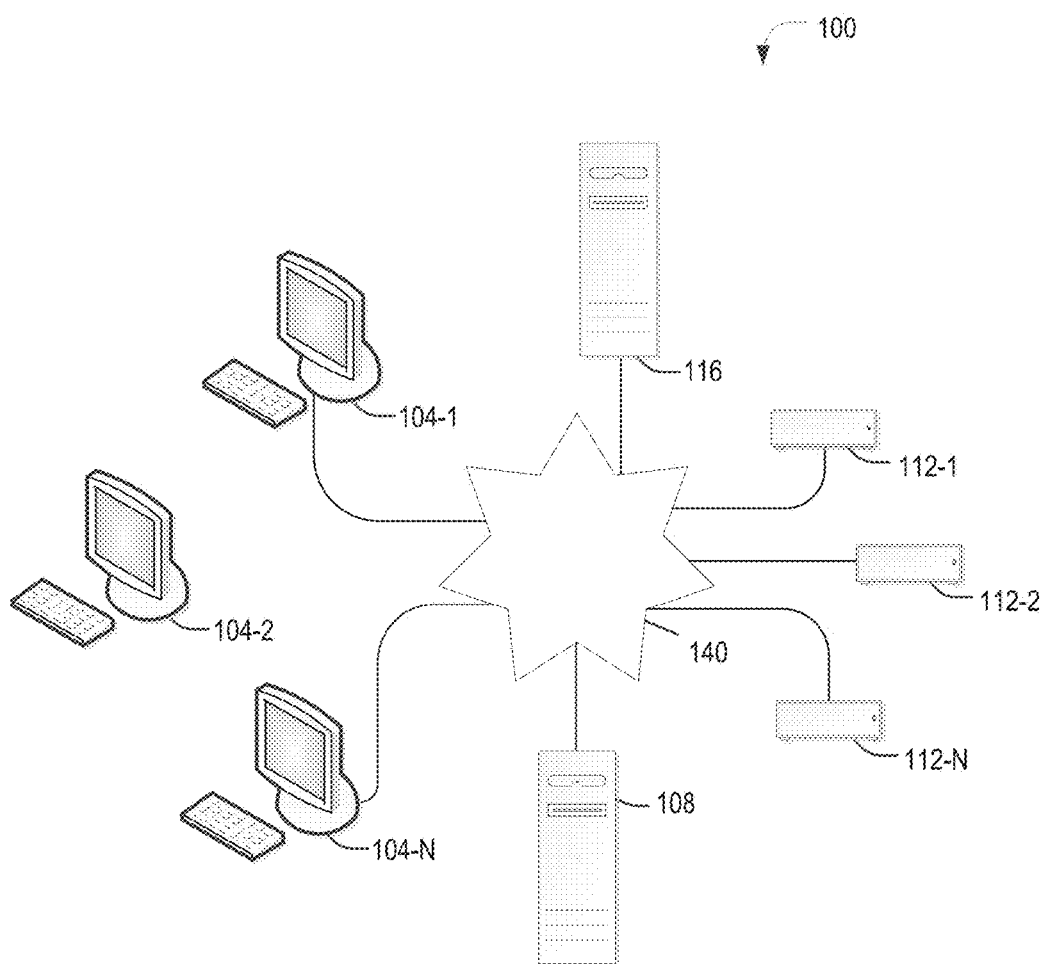
FIG. 1 is a block diagram of an example processing system for processing read and write requests for a data structure, in accordance with an example embodiment.

The description that follows includes illustrative systems, methods, techniques, instruction sequences, and computing program products that embody example embodiments of the present invention. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures and techniques have not been shown in detail.

Generally, methods, systems, apparatus, and computer program products for accessing data in a data structure are described. In one example embodiment, a data structure for storing data is logically separate from a data structure for reading the data. The write data structure may, for example, append the data of a write request to an end of a database table. A technique such as appending data to the end of a table may make writing data efficient, but may impair reading a subset of the data in the data structure, such as a particular data entry, since the data may not be stored in a known order or at a known location in the data structure.

In one example embodiment, a read data structure is generated by pre-aggregating data from the write data structure. The pre-aggregation may be performed immediately after a write operation, after a defined number of write operations, after a defined time delay period, at a scheduled time, and the like. The data may be aggregated, for example, by summarizing the data stored in the write data structure and storing the aggregated data in a read data structure for future use. (In one example embodiment, the aggregation comprises reorganizing and storing the data in the read data structure with or without summarizing the data.) For example, transactions in a database for product sales may be aggregated by computing the total count of transactions, the total count of transactions per product type, the total sales volume per product type, and the like. The aggregation may be based, for example, on a defined time window. For example, the data may be aggregated for a one-hour time period, a daily time period, a weekly time period, a monthly time period, a yearly time period, and the like. The aggregation may be performed based on a timestamp associated with the data, the time the data was written to the write data structure, the time of the request to write the data to the write data structure, and the like. For example, data aggregated on an hourly basis may consist of a first aggregation of data having timestamps between 1 PM and 2 PM, a second aggregation of data having timestamps between 2 PM and 3 PM, and so on. Based on the aggregation, the total count of transactions for a 24-hour period beginning at midnight may be found, for example, in a daily aggregation or 24 one-hour aggregations, and the total count of transactions for a one-hour period may be found, for example, in an hourly aggregation. It is to be noted that data for a particular time period (such as 1 PM to 2 PM on a particular day) may be included in the aggregates of various granularity, such as hourly, daily, weekly, and the like. Thus, care should be exercised to ensure that a single element, such as a single transaction in a database table, is counted only once when the data is read from the read data structure.

In on example embodiment, aggregation dimensions other than time may be used. For example, a location dimension may be utilized where the bucket types correspond to city, state, country, continent, and the like.

In one example embodiment, an aggregation (also known as a data bucket herein) may be maintained for a certain amount of time and then be discarded when it reaches a certain age in order, for example, to save storage space. For example, hourly aggregations may be maintained in storage for a month, daily aggregations may be maintained for two years, monthly aggregations may be maintained for five years, and yearly aggregations may be maintained indefinitely.

In one example embodiment, a read request, such as a data query, may be parsed and a result may be generated based on one or more of the stored data buckets. (A response, as used herein, is a result formatted for communication between various entities.) In a default mode, the aggregation(s) with the longest time windows which satisfy the request are returned. For example, a query with a time constraint that begins at 9 PM on a last day of a week and ends at 12 noon eight days later may comprise three one-hour aggregations corresponding to the first day of the time constraint, a weekly aggregation corresponding to days two through eight of the time constraint, and 12 one-hour aggregations corresponding to the ninth day of the time constraint.

In one example embodiment, a read request can specify the type of data buckets to be returned. For example, a request can indicate that the response should be composed of only hourly aggregations. Thus, a response to the example request with a time constraint of Jun. 5, 2016, would comprise 24 one-hour data buckets. In one example embodiment, the aggregations specified in the read request and returned in the read response may coincide exactly with the requested time constraint. For example, a request may specify hourly data buckets for a time constraint that is seven hours long and that begins on the hour.

In one example embodiment, the aggregations specified in the request and returned may not coincide exactly with the requested time constraint. For example, a request may specify weekly data buckets for a time constraint that is 12 days long and begins on a weekly basis (e.g., beginning at midnight on a Sunday). In this case, the read response may comprise two weekly aggregations. The client may be responsible for prorating the data by, for example, multiplying the data of the second weekly data bucket corresponding to days eight to twelve by ⅝ths (since only five days of the seven days of the second weekly data bucket are included in the time constraint).

In one example embodiment, specific types of data buckets may be requested to facilitate caching at a client. For example, a request with a time constraint of one day starting at midnight may be satisfied with a daily aggregation; the daily aggregation may be cached for future use. Alternatively, 24 one-hour aggregations may be requested and may be cached in anticipation of future read requests that are based on hourly time windows. In one example embodiment, multiple bucket types may be requested. For example, both hourly and daily aggregations may be requested.

FIG. 1 is a block diagram of an example processing system 100 for processing read and write requests for a data structure, in accordance with an example embodiment. In one example embodiment, the processing system 100 comprises client devices 104-1, . . . 104-N (collectively known as client devices 104 hereinafter), a load balancer 108, application nodes 112-1, . . . 112-N (collectively known as application nodes 112 hereinafter), and a data storage system 116.

Each client device 104 may be a personal computer (PC), a tablet computer, a mobile phone, a telephone, a personal digital assistant (PDA), a wearable computing device (e.g., a smartwatch), or any other appropriate computer device. The client device 104 may include a user interface module. In one example embodiment, the user interface module may include a web browser program and/or an application, such as a mobile application, an electronic mail application, and the like. Although a detailed description is only illustrated for the client device 104, it is to be noted that other user devices may have corresponding elements with the same functionality.

The load balancer 108 receives a request from a client device 104, forwards the request to an application node 112, and forwards responses from the application node 112 to the client device 104. The load balancer 108 also maintains session information in a session table. The maintained information may include, for each application node 112, the open session identifiers, a time of the last request sent to the application node 112, and the like.

The application nodes 112 process requests from the client devices 104 and return responses for the processed requests. In the example embodiment of FIG. 1, the application nodes 112 receive requests from the client devices 104 via the load balancer 108 and return the corresponding responses to the client devices 104 via the load balancer 108.

The data storage system 116 stores data for the client devices 104, the application nodes 112, and the like. The data storage system 116 comprises write data structures and read data structures. Each write data structure may contain, for example, a data table. As described above, new data may be written to the data table by appending the new data to the end of the data table.

Each read data structure may contain, for example, a data bucket. As described above, each data bucket is an aggregation of data from one or more write data structures and may correspond to a particular time window, such as a particular hour of the day, a particular day of the week, and the like.

The network 140 may be an ad hoc network, a switch, a router, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, another type of network, a network of interconnected networks, a combination of two or more such networks, and the like.

Figure 2:
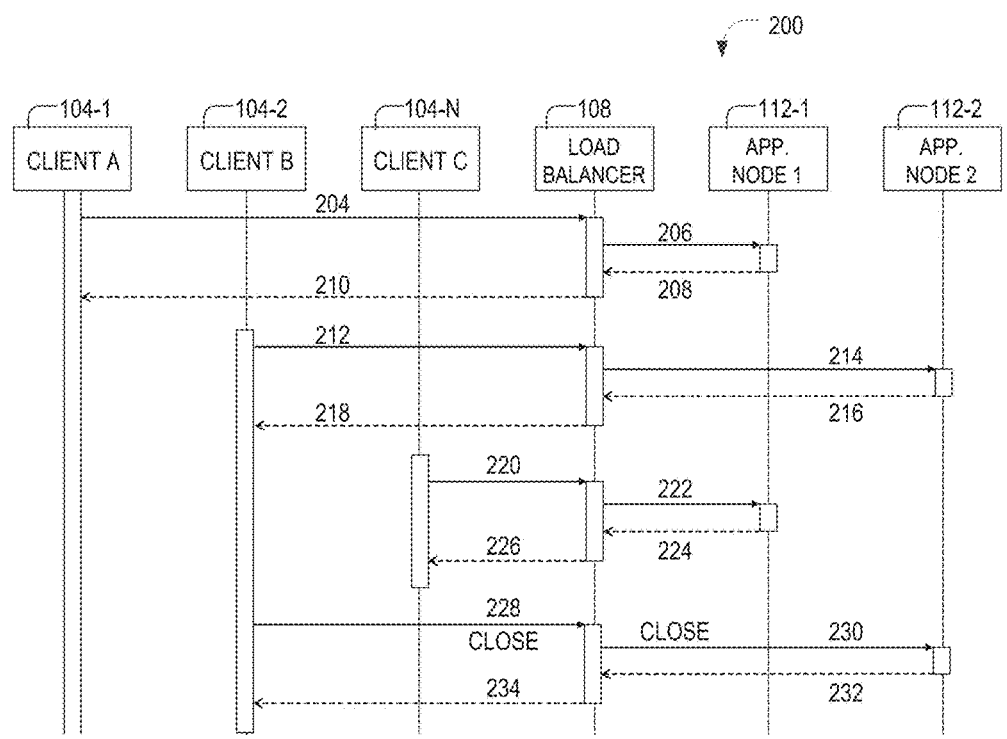
FIG. 2 is an example sequence diagram for a write or read request, according to an example embodiment.

FIG. 2 is an example sequence diagram 200 for a write or read request, according to an example embodiment. As illustrated in FIG. 2, the client device 104-1 (client A) issues a request 204 to the load balancer 108 and the load balancer 108 forwards a request 206 to the application node 112-1 (application node 1). Once the request 206 is processed, the application node 112-1 returns a response 208 to the load balancer 108. The load balancer 108 returns a response 210 to the client device 104-1.

Similarly, the client device 104-2 (client B) issues a request 212 to the load balancer 108 and the load balancer 108 forwards a request 214 to the application node 112-2 (application node 2). Once the request 214 is processed, the application node 112-2 returns a response 216 to the load balancer 108 and the load balancer 108 returns a response 218 to the client device 104-2. The client device 104-N (client C) issues a request 220 to the application node 112-1 via the load balancer 108 (see request 222, response 224, and response 226). In the example of a request 228 from the client device 104-2, the request 228 includes a close command which is forwarded from the load balancer 108 to the application node 112-2 via a request 230. The application node 112-2 generates a response 232 and closes the corresponding session. The load balancer 108 returns a response 234 to the client device 104-2.

Figure 3:
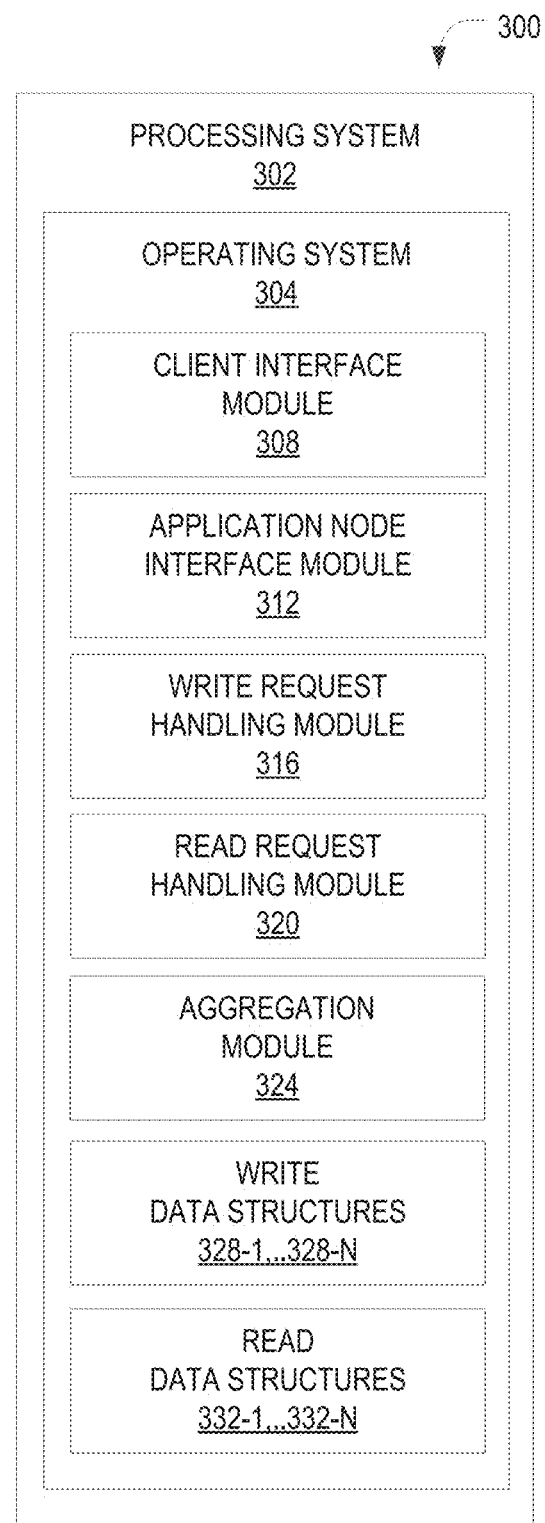
FIG. 3 is a block diagram of an example apparatus for implementing a data storage system, in accordance with an example embodiment.

FIG. 3 is a block diagram of an example apparatus 300 for implementing a data storage system 116, in accordance with an example embodiment. The apparatus 300 is shown to include a processing system 302 that may be implemented on a client or other processing device, and that includes an operating system 304 for executing software instructions.

In accordance with an example embodiment, the apparatus 300 may include a client interface module 308, an application node interface module 312, a write request handling module 316, a read request handling module 320, an aggregation module 324, write data structures 328-1, . . . 328-N (collectively known as write data structures 328 hereinafter), and read data structures 332-1, . . . 332-N (collectively known as read data structures 332 hereinafter).

The client interface module 308 receives requests, such as write requests and read requests, from the client devices 104, and provides responses to the client devices 104. The application node interface module 312 receives requests, such as write requests and read requests, from the application nodes 112, and provides responses to the application nodes 112. It is to be noted that requests from the client devices 104 may directly access the data storage system 116 or may access the data storage system 116 via the application node 112.

Figure 5A:
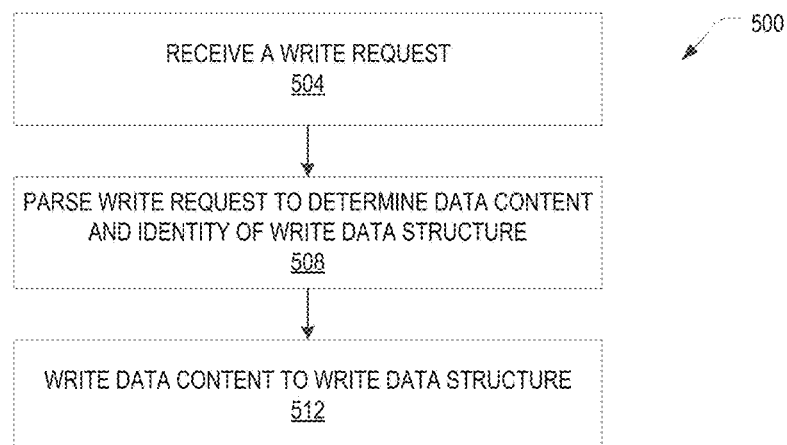
FIG. 5A is a flowchart for an example method for processing a write request, according to an example embodiment.

The write request handling module 316 processes write requests from the client devices 104 and application nodes 112, as described more fully by way of example in conjunction with FIG. 5A. The read request handling module 320 processes read requests from the client devices 104 and application nodes 112, as described more fully by way of example in conjunction with FIG. 5B.

Figure 6:
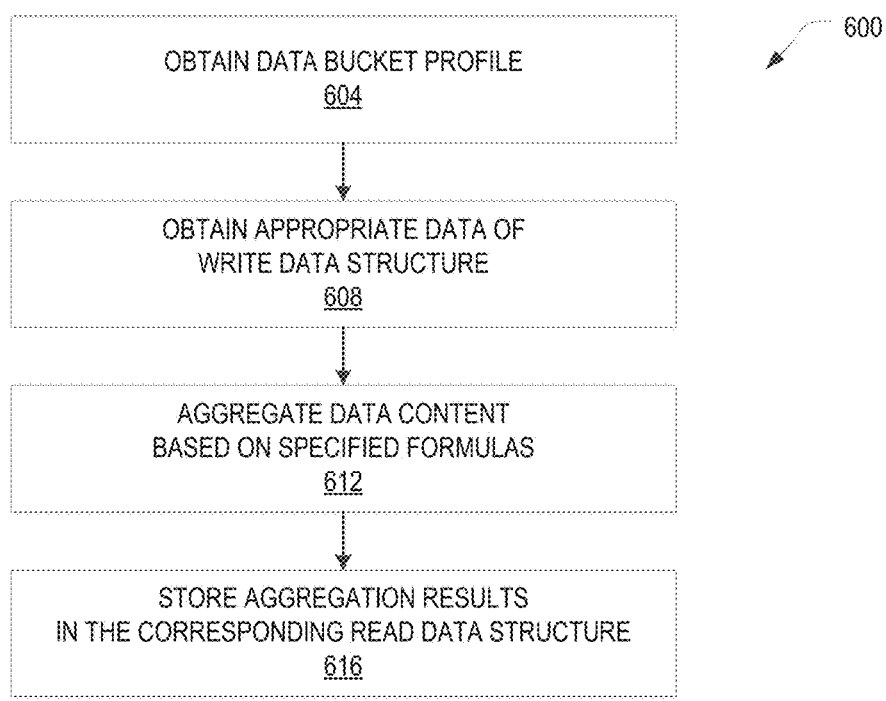
FIG. 6 is a flowchart for an example method for aggregating data, according to an example embodiment.

The aggregation module 324 reads the data content of the write data structure 328, aggregates the read data content to generate a data bucket, and stores the data bucket in one of the read data structures 332, as described more fully by way of example in conjunction with FIG. 6.

The write data structures 328-1, . . . 328-N may, for example, contain transactional information stored in each row of a table. New data, such as a new transaction, may be appended via a write request to an end of the table. The read data structures 332-1, . . . 332-N may be generated by pre-aggregating data from one or more of the write data structures 328. The data may be aggregated, for example, by summarizing the data stored in the write data structures 328 and storing the aggregated data in the read data structures 332 for future use. For example, transactions in a table for product sales may be aggregated by computing the total count of transactions, the total count of transactions per product type, the total sales volume per product type, and the like.

FIG. 4A is an example table 400 for the write data structure 328, according to an example embodiment. Each row 404 of the table 400 corresponds to a particular transaction. A transaction identifier column 408 contains a transaction identifier for each transaction, a product type column 412 contains a product type code for the corresponding transaction, a product volume column 416 contains a product volume for the corresponding transaction, and a sales volume column 420 contains a sales volume ($US M) of the corresponding transaction.

FIG. 4B is an example table 450 of the read data structure 332, according to an example embodiment. Each row 454 of the table 450 corresponds to a particular data bucket. For example, row 454-1 may correspond to Jun. 4, 2016 between 1 PM and 2 PM and row 454-2 may correspond to Jun. 4, 2016 between 2 PM and 3 PM. Each column of the table 450 contains a parameter related to the corresponding data bucket of the table 450. For example, a total transaction count column 458 contains a count of transactions corresponding to the time window of the corresponding data bucket, a sales volume column 462 contains the sales volume ($US) of the transactions corresponding to the time window of the corresponding data bucket, a product X sales volume column 466 contains the sales volume ($US) of product X for the transactions corresponding to the time window of the corresponding data bucket, and a product Y sales volume column 470 contains the sales volume ($US) of product Y for the transactions corresponding to the time window of the corresponding data bucket.

FIG. 4C is an example profile for defining a data aggregation, according to an example embodiment. The profile defines the data to be aggregated (e.g., an identification of a write data structure 328, an identification of particular data content (such as a particular table) of a specified write data structure 328, and the like), and the aggregation formula (e.g., a summation, a count, and the like). In one example embodiment, the profile identifies a read data structure 332 for the data bucket. In the example of FIG. 4C, the data content that is subject to aggregation is the transaction identifier, the sales volume, the product X sales volume, and the product Y sales volume. The aggregated data is the total count of transactions, the sales volume of all the transactions in the table, the sales volume of the product X, and the sales volumes of the product Y. By default, the aggregation is performed using one-hour, daily, weekly, monthly, and yearly time windows. In one example embodiment, the type of time windows used in the aggregation may be defined in the profile (not shown).

FIG. 5A is a flowchart for an example method 500 for processing a write request, according to an example embodiment. In one example embodiment, the method 500 is performed by the write request handling module 316.

In one example embodiment, the write request handling module 316 receives a write request, such as a write request from the application node 112-1 (operation 504). The write request is parsed to determine the identity of the write data structure 328 and the data content to be written to the identified write data structure 328 (operation 508). The data content is written to the identified write data structure 328 (operation 512). For example, the data content may be formatted according to the format of the row 404 of the table 400 and appended to the end of the table 400. The method 500 then ends.

Figure 5B:
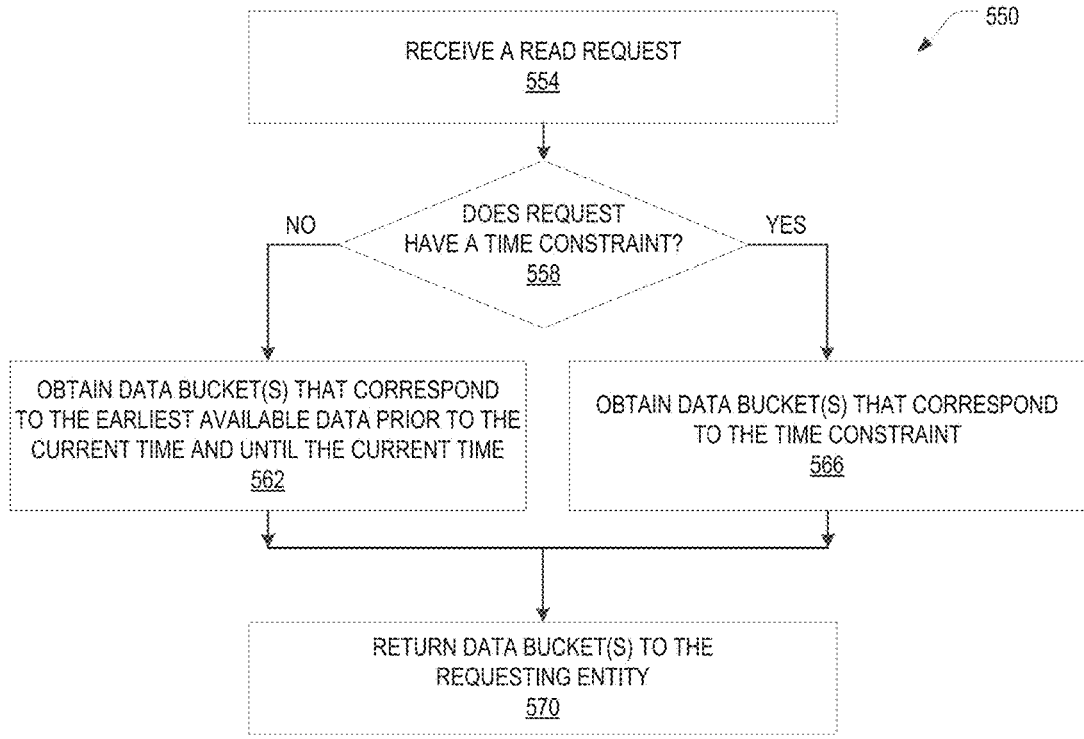
FIG. 5B is a flowchart for an example method for processing a read request, according to an example embodiment.

FIG. 5B is a flowchart for an example method 550 for processing a read request, according to an example embodiment. In one example embodiment, the method 550 is performed by the read request handling module 320.

In one example embodiment, the read request handling module 320 receives a read request, such as a read request from the client device 104 (operation 554). A determination is made of whether the read request has a time constraint (operation 558).

If the request has no time constraint, the data bucket(s) that correspond to the earliest available data prior to the current time and until the current time are obtained (operation 562). For example, the data buckets corresponding to the most recent complete calendar years, the data buckets corresponding to the most recent complete months of the current calendar year, the data buckets corresponding to the most recent complete weeks of the current calendar month, the data buckets corresponding to the most recent complete days of the current calendar week, and the data buckets corresponding to the most recent complete hours of the current calendar day are obtained. The obtained data buckets are returned to the requesting entity (operation 570). The method 550 then ends.

If the request has a time constraint, the data buckets that correspond to the time constraint are obtained (operation 566). For example, the data buckets, if any, corresponding to the complete calendar years that are encompassed by the time constraint are obtained, the data buckets, if any, corresponding to the complete calendar months that are encompassed by the time constraint (and not covered by the obtained complete calendar years) are obtained, the data buckets, if any, corresponding to the complete calendar weeks that are encompassed by the time constraint (and not covered by the obtained complete calendar years or the complete calendar months) are obtained, the data buckets, if any, corresponding to the complete calendar days that are encompassed by the time constraint (and not covered by the obtained complete calendar years, the complete calendar months, or the complete calendar weeks) are obtained, and the data buckets, if any, corresponding to the complete hours of the present day that are encompassed by the time constraint (and not covered by the obtained complete calendar years, the complete calendar months, the complete calendar weeks, or the complete calendar days) are obtained. A data bucket is encompassed by a time constraint if the beginning of the time window of the corresponding data bucket falls within the time constraint and the end of the time window of the corresponding data bucket falls within the time constraint. The obtained data buckets are returned to the requesting entity (operation 570). The method 550 then ends.

FIG. 6 is a flowchart for an example method 600 for aggregating data, according to an example embodiment. In one example embodiment, the method 600 is performed by the aggregation module 324. The aggregation module 324 reads the data content of the write data structure 328, aggregates the read data content to generate a data bucket, and stores the data bucket in one of the read data structures 332.

In one example embodiment, a profile of a data bucket (such as the example profile of FIG. 4C) is obtained (operation 604). The profile defines the data to be aggregated (e.g., an identification of a write data structure 328, an identification of particular data content of a specified write data structure 328, and the like), the aggregation formula (e.g., a summation), and the format of the data bucket. For example, the profile may indicate that the first entry of the data bucket is the total count of transactions in the identified write data structure 328 and is generated by counting the number of transaction identifiers (or, equivalently, the number of rows) in the table 400 of the identified write data structure 328. The second entry of the data bucket may be the total number of transactions for a product X in the table 400 of the identified write data structure 328 and is generated by counting the number of transaction identifiers having the product type code for product X in the product type column 412 of the table 400 of the identified write data structure 328. The third entry of the data bucket may be the sales volume for product X in the table 400 of the identified write data structure 328 and is generated by summing the sales volumes in the sales volume column 420 for each transaction having the product type code for product X in the product type column 412 of the table 400 of the identified write data structure 328.

The appropriate data content of the identified write data structure 328 is obtained (as defined in the profile; operation 608) and the data content is aggregated based on the specified formulas (as defined in the profile; operation 612). The aggregation results are written to the appropriate read data structure 332 based on the data format of the read data structure 332 (operation 616). The read data structure 332 may be identified in the profile, may be selected by the aggregation module 324, may be provided by the data storage system 116, and the like. In one example embodiment, the data format of the read data structure 332 may be identified in the profile, obtained from the data storage system 116, provided by the data storage system 116, and the like.

Figure 7:
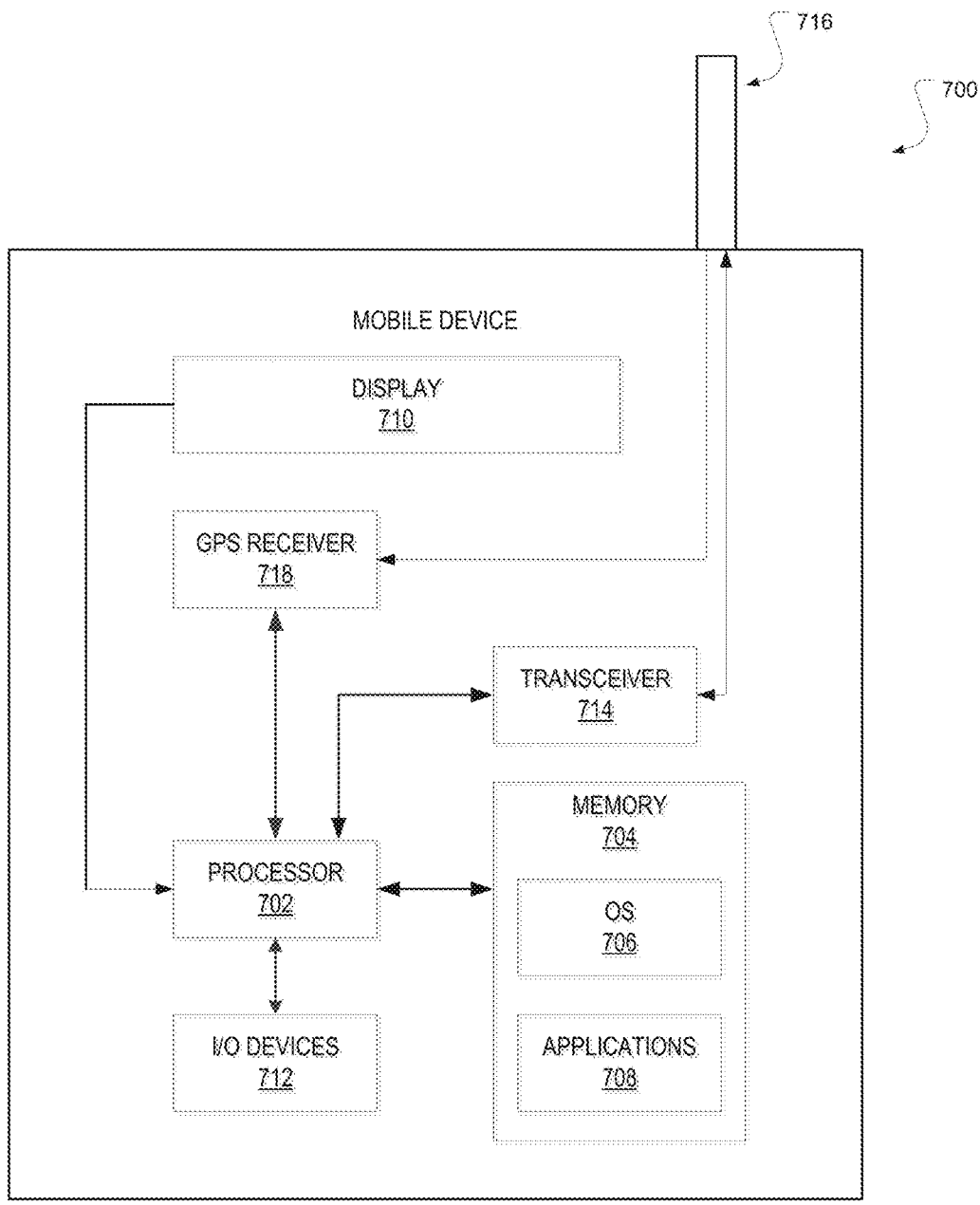
FIG. 7 is a block diagram illustrating a mobile device, according to an example embodiment.

FIG. 7 is a block diagram illustrating a mobile device 700, according to an example embodiment. The mobile device 700 can include a processor 702. The processor 702 can be any of a variety of different types of commercially available processors suitable for mobile devices 700 (for example, an XScale architecture microprocessor, a microprocessor without interlocked pipeline stages (MIPS) architecture processor, or another type of processor). A memory 704, such as a random access memory (RAM), a flash memory, or another type of memory, is typically accessible to the processor 702. The memory 704 can be adapted to store an operating system (OS) 706, as well as applications 708, such as a mobile location-enabled application that can provide location-based services (LBSs) to a user. The processor 702 can be coupled, either directly or via appropriate intermediary hardware, to a display 710 and to one or more input/output (I/O) devices 712, such as a keypad, a touch panel sensor, and a microphone. Similarly, in some embodiments, the processor 702 can be coupled to a transceiver 714 that interfaces with an antenna 716. The transceiver 714 can be configured to both transmit and receive cellular network signals, wireless data signals, or other types of signals via the antenna 716, depending on the nature of the mobile device 700. Further, in some configurations, a global positioning system (GPS) receiver 718 can also make use of the antenna 716 to receive GPS signals.

Figure 8:
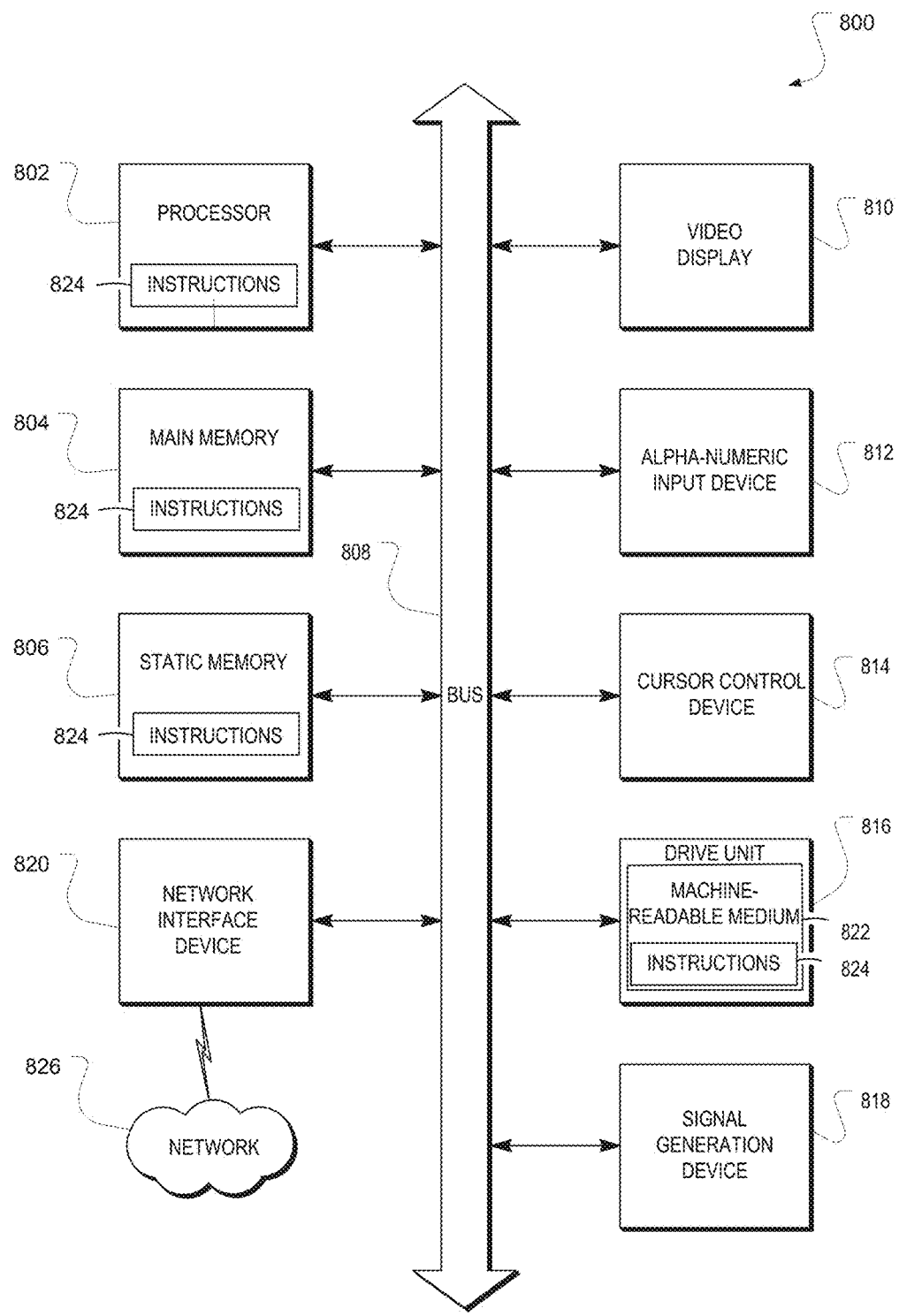
FIG. 8 is a block diagram of a computer processing system within which a set of instructions may be executed for causing a computer to perform any one or more of the methodologies discussed herein.

FIG. 8 is a block diagram of a computer processing system 800 within which a set of instructions 824 may be executed for causing a computer to perform any one or more of the methodologies discussed herein. In some embodiments, the computer operates as a standalone device or may be connected (e.g., networked) to other computers. In a networked deployment, the computer may operate in the capacity of a server or a client computer in server-client network environment, or as a peer computer in a peer-to-peer (or distributed) network environment.

In addition to being sold or licensed via traditional channels, embodiments may also, for example, be deployed as software-as-a-service (SaaS), by an application service provider (ASP), or by utility computing providers. The computer may be a server computer, a personal computer (PC), a tablet PC, a personal digital assistant (PDA), a cellular telephone, or any processing device capable of executing a set of instructions 824 (sequential or otherwise) that specify actions to be taken by that device. Further, while only a single computer is illustrated, the term "computer" shall also be taken to include any collection of computers that, individually or jointly, execute a set (or multiple sets) of instructions 824 to perform any one or more of the methodologies discussed herein.

The example computer processing system 800 includes a processor 802 (e.g., a central processing unit (CPU), a graphics processing unit (GPU), or both), a main memory 804, and a static memory 806, which communicate with each other via a bus 808. The computer processing system 800 may further include a video display 810 (e.g., a plasma display, a liquid crystal display (LCD), or a cathode ray tube (CRT)). The computer processing system 800 also includes an alphanumeric input device 812 (e.g., a keyboard), a cursor control device 814 (e.g., a mouse and/or touch screen), a drive unit 816, a signal generation device 818 (e.g., a speaker), and a network interface device 820.

The drive unit 816 includes a machine-readable medium 822 on which is stored one or more sets of instructions 824 and data structures embodying or utilized by any one or more of the methodologies or functions described herein. The instructions 824 may also reside, completely or at least partially, within the main memory 804, the static memory 806, and/or the processor 802 during execution thereof by the computer processing system 800, the main memory 804, the static memory 806, and the processor 802 also constituting tangible machine-readable media 822.

The instructions 824 may further be transmitted or received over a network 826 via the network interface device 820 utilizing any one of a number of well-known transfer protocols (e.g., Hypertext Transfer Protocol (HTTP)).

While the machine-readable medium 822 is shown, in an example embodiment, to be a single medium, the term "machine-readable medium" should be taken to include a single medium or multiple media (e.g., a centralized or distributed database, and/or associated caches and servers) that store the one or more sets of instructions 824. The term "machine-readable medium" shall also be taken to include any medium that is capable of storing, encoding, or carrying a set of instructions 824 for execution by the computer and that cause the computer to perform any one or more of the methodologies of the present application, or that is capable of storing, encoding, or carrying data structures utilized by or associated with such a set of instructions 824. The term "machine-readable medium" shall accordingly be taken to include, but not be limited to, solid-state memories and optical and magnetic media.

While the embodiments of the invention(s) is (are) described with reference to various implementations and exploitations, it will be understood that these embodiments are illustrative and that the scope of the invention(s) is not limited to them. In general, techniques for maintaining consistency between data structures may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

What is claimed is:

1. A computerized method for accessing information organized by time, the method comprising:
    reading data from a write data structure in a database;
    aggregating, using one or more hardware processors, the data to generate a plurality of data buckets associated with a corresponding plurality of time windows, wherein a first data bucket of the plurality of data buckets corresponds to a first time window of the plurality of time windows, and a second data bucket of the plurality of data buckets corresponds to a second time window of the plurality of time windows, the second time window being shorter than the first time window;
    storing the plurality of data buckets in a read data structure in the database;
    receiving a time constraint associated with a data query to the database, the time constraint describing a time period;
    selecting the first data bucket for responding to the data query, wherein selecting the first data bucket comprises:
        determining that at least a portion of the first data bucket satisfies the data query; and
        determining that the first time window is a longest time window of the plurality of time windows that is within the time period;
    selecting the second data bucket for responding to the data query, wherein selecting the second data bucket comprises:
        determining that at least a portion of the second data bucket satisfies the data query; and
        determining that the second time window is within the time period, wherein the second time window and the first time window do not overlap; and
    providing a query response to the data query, the query response comprising at least a portion of the first data bucket and at least a portion of the second data bucket.

2. The computerized method of claim 1, wherein the aggregation summarizes the data.

3. The computerized method of claim 1, wherein the aggregation summarizes the data by counting a number of occurrences of a same data type during the corresponding time window.

4. The computerized method of claim 1, wherein the aggregation summarizes the data by summing a value of each occurrence of a same data type during the corresponding time window.

5. The computerized method of claim 1, wherein the first time window has a length of one hour, one day, one week, one month, or one year.

6. The computerized method of claim 1, wherein a plurality of the data buckets are aggregated at least partially from a same portion of data of the write data structure.

7. The computerized method of claim 1, further comprising selecting at least one additional data bucket for responding to the data query such that every portion of the time constraint has a corresponding selected data bucket.

8. An apparatus for configuring runtime bundles on a computer, the apparatus comprising:
    one or more hardware processors;
    memory to store instructions that, when executed by he one or more hardware processors perform operations comprising:
        reading data from a write data structure in a database;
        aggregating, using one or more hardware processors, the data to generate a plurality of data buckets associated with a corresponding plurality of time windows, wherein a first data bucket of the plurality of data buckets corresponds to a first time window of the plurality of time windows, and a second data bucket of the plurality of data buckets corresponds to a second time window of the plurality of time windows, the second time window being shorter than the first time window;
        storing the plurality of data buckets in a read data structure in the database;

receiving a time constraint associated with a data query to the database, the time constraint describing a time period;

selecting the first data bucket for responding to the data query, wherein selecting the first data bucket comprises:
- determining that at least a portion of the first data bucket satisfies the data query; and
- determining that the first time window is a longest time window of the plurality of time windows that is within the time period;

selecting the second data bucket for responding to the data query, wherein selecting the second data bucket comprises:
- determining that at least a portion of the second data bucket satisfies the data query; and
- determining that the second time window is within the time period, wherein the second time window and the first time window do not overlap; and providing a query response to the data query the query response comprising at least a portion of the first data bucket and at least a portion of the second data bucket.

9. The apparatus of claim 8, wherein the aggregation summarizes the data.

10. The apparatus of claim 8, wherein the aggregation summarizes the data by counting a number of occurrences of a same data type during the corresponding time window.

11. The apparatus of claim 8, wherein the aggregation summarizes the data by summing a value of each occurrence of a same data type during the corresponding time window.

12. The apparatus of claim 8, wherein the time window has a length of one hour, one day, one week, one month, or one year.

13. The apparatus of claim 8, wherein a plurality of the data buckets are aggregated at least partially from a same portion of data of the write data structure.

14. The apparatus of claim 8, the operations further comprising selecting at least one additional data bucket for responding to the data query such that every portion of the time constraint has a corresponding selected data bucket.

15. A non-transitory machine-readable storage medium comprising instructions, which when implemented by one or more machines, cause the one or more machines to perform operations comprising:

reading data from a write data structure in a database;

aggregating, using one or more hardware processors, the data to generate a plurality of data buckets associated with a corresponding plurality of time windows, wherein a first data bucket of the plurality of data buckets corresponds to a first time window of the plurality of time windows, and a second data bucket of the plurality of data buckets corresponds to a second time window of the plurality of time windows, the second time window being shorter than the first time window; and storing the plurality of data bucket in a read data structure in the database;

receiving a time constraint associated with a data query to the database, the time constraint describing a time period;

selecting the first data bucket for responding to the data query, wherein selecting the first data bucket comprises:
- determining that at least a portion of the first data bucket satisfies the data query; and
- determining that the first time window is a longest time window of the plurality of time windows that is within the time period;

selecting the second data bucket for responding to the data query, wherein selecting the second data bucket comprises:
- determining that at least a portion of the second data bucket satisfies the data query; and
- determining that the second time window is within the time period, wherein the second time window and the first time window do not overlap: and providing a query response to the data query, the query response comprising at least a portion of the first data bucket and at least a portion of the second data bucket.

16. The medium of claim 15, wherein the aggregation summarizes the data.

17. The medium of claim 15, wherein the aggregation summarizes the data by counting a number of occurrences of a same data type during the corresponding time window.

18. The medium of claim 15, wherein the aggregation summarizes the data by summing a value of each occurrence of a same data type during the corresponding time window.

19. The medium of claim 15, wherein the time window has a length of one hour, one day, one week, one month, or one year.

20. The medium of claim 15, wherein a plurality of the data buckets are aggregated at least partially from a same portion of data of the write data structure.

21. The medium of claim 15, the operations further comprising selecting at least one additional data bucket for responding to the data query such that every portion of the time constraint has a corresponding selected data bucket.

* * * * *